US007121466B2

(12) United States Patent
Charbonneau

(10) Patent No.: US 7,121,466 B2
(45) Date of Patent: Oct. 17, 2006

(54) BAR ENCODING SCHEME FOR A SCROLLING DISPLAY

(75) Inventor: Yvon Charbonneau, Beaconsfield (CA)

(73) Assignee: Sirona Inc., London (GB)

( * ) Notice: Subject to any disclaimer, the term of this patent is extended or adjusted under 35 U.S.C. 154(b) by 189 days.

(21) Appl. No.: 10/612,896

(22) Filed: Jul. 7, 2003

(65) Prior Publication Data

US 2005/0007388 A1 Jan. 13, 2005

(51) Int. Cl.
*G06K 7/10* (2006.01)
*G03B 23/02* (2006.01)

(52) U.S. Cl. ................. 235/462.01; 353/25; 353/26 R; 353/26 A; 235/375; 235/462.08

(58) Field of Classification Search .............. 353/26 A, 353/27 A, 25, 26 R; 235/426.01, 462.02, 235/462.05, 375, 462.01, 462.08
See application file for complete search history.

(56) References Cited

U.S. PATENT DOCUMENTS 4,174,891 A * 11/1979 Flint et al. ................ 353/26 A
4,854,696 A * 8/1989 Guez ........................... 352/90
4,875,768 A * 10/1989 Hirasawa et al. ......... 353/27 A
5,237,156 A * 8/1993 Konishi et al. ............. 235/375
5,597,994 A 1/1997 Hornung et al.
5,796,090 A * 8/1998 Pavlidis et al. ........ 235/462.05
6,105,870 A * 8/2000 Kimura et al. ......... 235/462.02
6,556,273 B1 * 4/2003 Wheeler et al. .............. 352/92
6,556,276 B1 * 4/2003 Staeheli et al. ............... 355/40
6,572,011 B1 * 6/2003 Allman et al. .............. 235/375

FOREIGN PATENT DOCUMENTS

EP 0 576 220 A 12/1993
WO WO 92/18969 A 10/1992

OTHER PUBLICATIONS

Palmer, Roger C. The Bar Code Book, 3rd Ed., 1995, Helmers Publishing, Inc., pp. 23.*

* cited by examiner

*Primary Examiner*—Daniel Stcyr
*Assistant Examiner*—Daniel A. Hess
(74) *Attorney, Agent, or Firm*—Ogilvy Renault LLP

(57) ABSTRACT

A method and apparatus is disclosed for providing an encoding scheme for a scrolling display comprising a plurality of sequences of bar codes, each sequence of bar codes identifying a corresponding display on a moving scroll, each sequence of bar codes comprising a "start reading" code and an associated data code, the associated data code identifying uniquely the corresponding display.

6 Claims, 7 Drawing Sheets

BAR ENCODING SCHEME FOR A SCROLLING DISPLAY

CROSS-REFERENCE TO RELATED APPLICATIONS

This is the first application filed for the present invention.

TECHNICAL FIELD

This invention relates to the field of encoding schemes. More precisely, this invention pertains to the field of displaying an image using a scrolling display.

BACKGROUND OF THE INVENTION

Images are displayed to the public using various techniques.

For instance, in one embodiment a screen display may be used. While it will be appreciated that such embodiment is remotely controllable, someone skilled in the art will appreciate that it is quite costly to implement and that in some cases, such display may suffer from its surrounding environment.

For instance, it may suffer from climatic parameter variations such as pressure, humidity, dust and temperature and such display requires therefore extra caution. Furthermore, such display may be easily vandalized.

In the case of a display where information has to be updated, such as in the case of gas price display for instance, there is a need for an autonomous display that will be able to properly update a price according to a change. Such update has to be performed quickly to avoid confusion in the public.

A scrolling display is disclosed for instance in U.S. Pat. No. 5,410,330. While it will be appreciated that such display uses length markers positioned along the edge of a scroll, the patent discloses that a photo sensor is positioned to detect marks placed along one edge of the scroll. It is further disclosed that two marks are used, a small mark is used to locate the middle of each frame to be viewed except the first and last frame and a longer mark is used to signal the middle of the first and last frame of the chart.

Someone skilled in the art will appreciate that it is not possible to identify a particular frame using such scheme.

U.S. Pat. No. 2,612,994 discloses a classifying method and apparatus. However, the skilled addressee will appreciate that such embodiment is not suitable for identifying a fast moving scroll.

There is a need for a method and apparatus that will overcome the above-identified drawbacks.

SUMMARY OF THE INVENTION

It is an object of the invention to provide a method for using a bar code, in a scrolling display apparatus, which enables identifying and positioning a displayed part of the scroll.

It is another object of the invention to an apparatus for identifying and positioning a displayed part of the scroll in a scrolling display apparatus.

According to a first aspect of the invention, there is provided a method for controlling a scrolling display, the method comprising providing a moving scroll having a plurality of sequences of bar codes, each sequence of bar codes identifying a corresponding display on the moving scroll, each sequence of bar codes comprising a "start reading" code and an associated data code, the associated data code identifying uniquely the corresponding display, providing a display request comprising a request for a specific display on the moving scroll of the scrolling display, moving the moving scroll to detect a "start reading" code, reading the data code associated to the detected "start reading" code and providing the specific display if the associated data code is representative of the scrolling display request.

According to another aspect of the invention, there is provided a sequence of bar codes used for uniquely identifying a corresponding display on a moving scroll of a scrolling display, the sequence of bar codes comprising a "start reading" code identifying a beginning of the sequence of bar codes and a data code associated with the "start reading" code and comprising a plurality of bar codes identifying uniquely the corresponding display, each of the plurality of bar codes and its associated the "start reading" code being spaced by a predetermined space.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
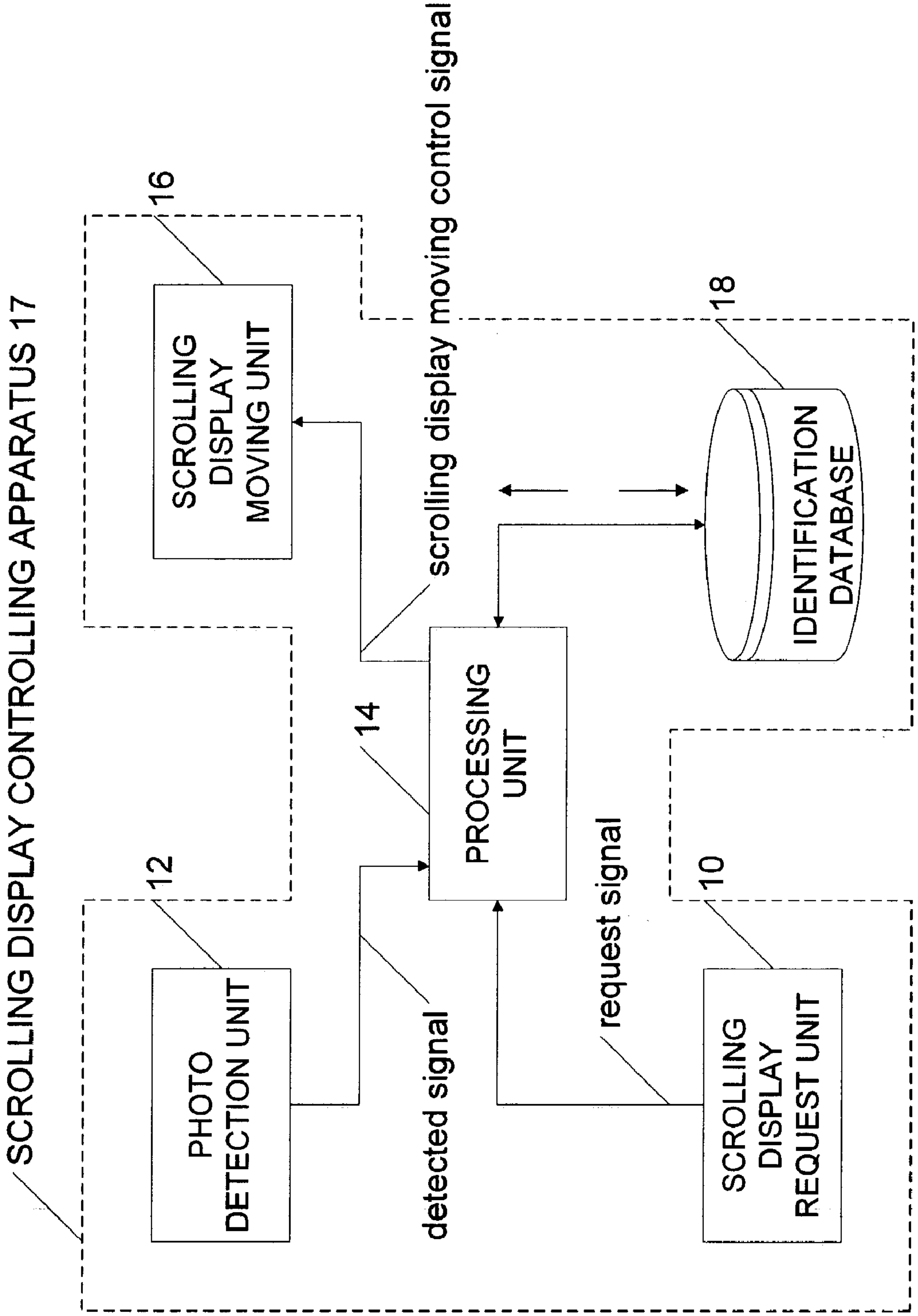
FIG. 1 is a diagram which shows a scrolling display controlling apparatus.

Now referring to FIG. 1, there is shown a block diagram which shows the scrolling display controlling apparatus 17. The scrolling display controlling apparatus 17 is used to control a scrolling display.

The scrolling display controlling apparatus 17 comprises a scrolling display request unit 10, a photo detection unit 12, a processing unit 14, a scrolling display moving unit 16 and a database 18.

The scrolling display request unit 10 receives a request signal for a display from an operator or a processing unit. In one embodiment, the request signal is received using a wireless connection. In an another embodiment the request signal is received using a wire connection.

The photo detection unit 12 is positioned to detect a sequence of bar codes placed along an edge of the scroll. The sequence of bar codes comprises preferably a plurality of dark bars as explained below.

More precisely, the photo detection unit 12 provides a detection signal in response to a photo detection performed on a bar code. The detection signal is provided to the processing unit 14.

The scrolling display moving unit 16 comprises a plurality of motors adapted to scroll a display of the scrolling display apparatus. The processing unit 14 provides a scrolling display moving control signal to the scrolling display moving unit 16. The scrolling display moving control signal comprises, inter alia, a direction moving signal for the plurality of motors. The direction moving signal relates to a rotating direction for the plurality of motors.

In the preferred embodiment, the plurality of motors comprises carbon brush DC motors allowing forward and reverse motion.

The database 18 comprises a plurality of data. More precisely and as explained below, the database 18 comprises a plurality of allowable requests to the scrolling display. The database 18 further comprises a current sequence of bar codes and a desired request to the scrolling display.

Figures 2A, 2B, 2C:
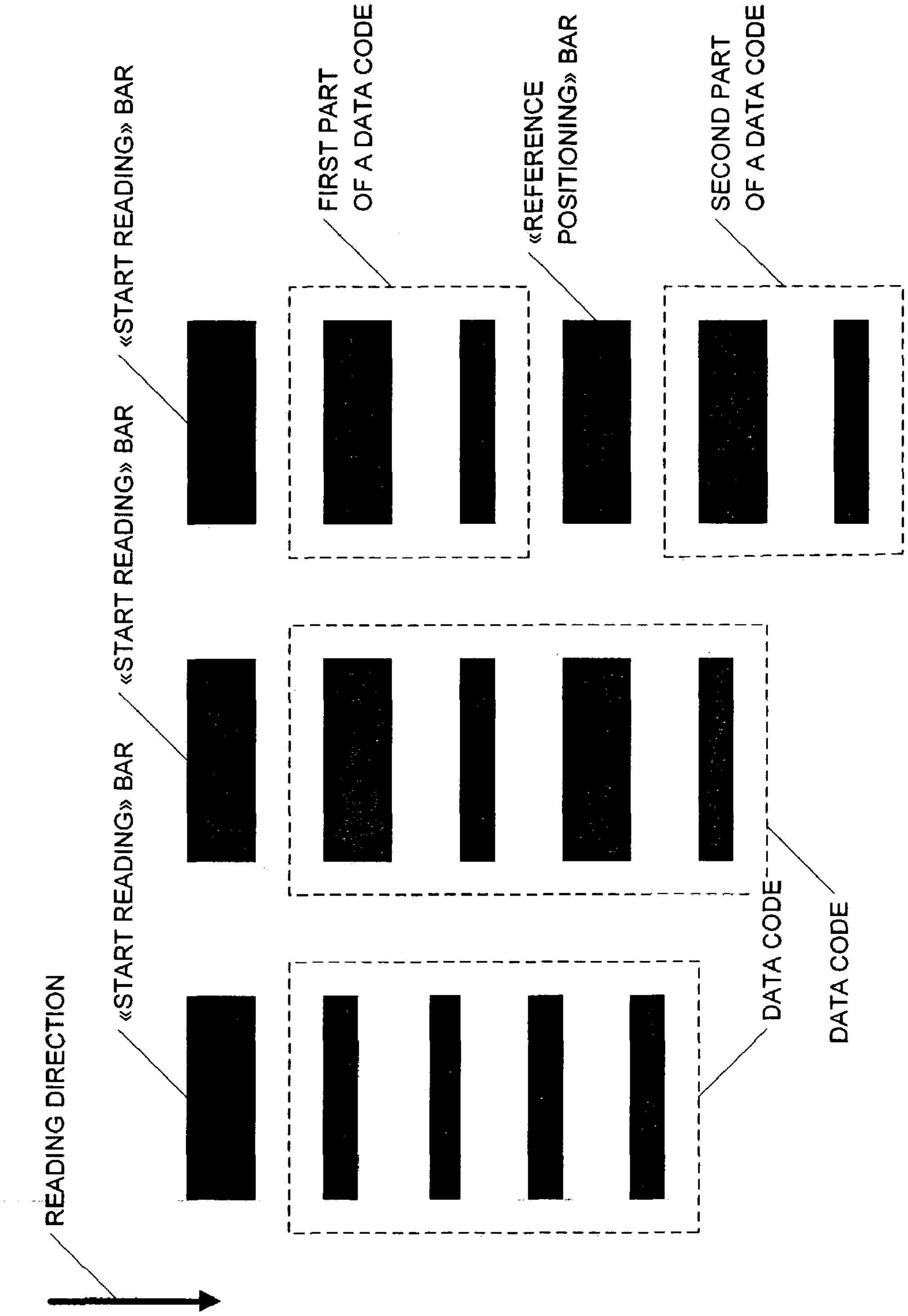
FIG. 2*a* is a schematic which shows a first sequence of bar codes, defined according to a first coding scheme, to be used in a scrolling display apparatus.
FIG. 2*b* is a schematic which shows a second sequence of bar codes, defined according to a second coding scheme, to be used in the scrolling display apparatus.
FIG. 2*c* is a schematic which shows a third sequence of bar codes, defined according to a third coding scheme, to be used in the scrolling display apparatus.

Now referring to FIG. 2*a*, there is shown a first sequence of bar codes, defined according to a first coding scheme.

The sequence of bar codes disclosed in FIG. 2*a* comprises a “start reading” code and a data code. The “start reading” code is preferably a large width bar and is used in order to define the start of the sequence of bar code. The data code comprises a plurality of bars which represent a data according to the first coding scheme. In this example the data code comprises four small width bars.

Referring to FIG. 2*b*, there is shown a second sequence of bar codes defined according to a second coding scheme.

The sequence of bar codes disclosed in FIG. 2*b* comprises a “start reading” code and a data code. In this example, the data code comprises a combination of at least one small width bar and at least one large width bar. The combination is used in order to represent data according to the second coding scheme. The skilled addressee will appreciate that in one embodiment the data may be coded in the combination using a BCD coding scheme or any one of the like.

Referring to FIG. 2*c*, there is shown a third sequence of bar codes, defined according to a third coding scheme.

The third sequence of bar codes comprises a “start reading” code, a first part of a data code, a reference positioning code and a second part of a data code.

The “start reading” code is used in order to indicate the start of the sequence of bar codes. The reference positioning code is used in order to position a corresponding scroll display at a predetermined position. In the preferred embodiment, the reference positioning code is a large width bar. The first part of a data code and the second part of a data code are used in order to code data according to a coding scheme. Preferably, the reference positioning code and the “start reading” code are a large width bar while the first part of the data code and the second part of the data code comprises at least one of a large width bar and at least one of a small width bar.

The skilled addressee will appreciate that in one embodiment the data may be encoded, using the first part of a data code and the second part of a data code, with a BCD coding scheme or any one of the like.

The skilled addressee will also appreciate that in the preferred embodiment, each bar of the sequence of bars is equally spaced of neighboring bars.

Figure 3:
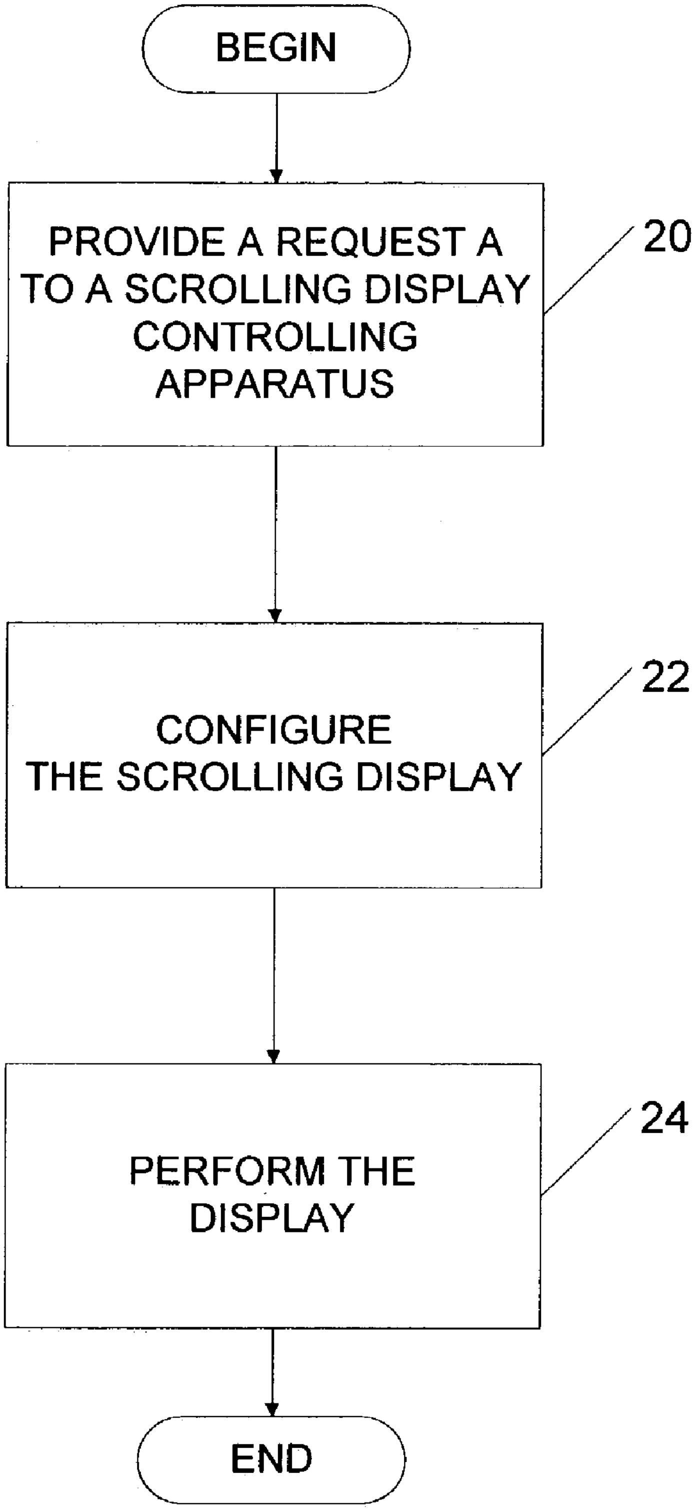
FIG. 3 is a flowchart which shows the preferred embodiment of the invention; a request to the scrolling display apparatus is performed; the scrolling display apparatus is configured and a display is performed.

Now referring to FIG. 3A, there is shown a flowchart which shows the preferred embodiment of the invention.

According to step 20, a request to a scrolling display is provided to the scrolling display controlling apparatus 17.

According to step 22, the scrolling display is configured using the scrolling display controlling apparatus 17.

According to step 24, the display is performed using the scrolling display.

Figure 4:
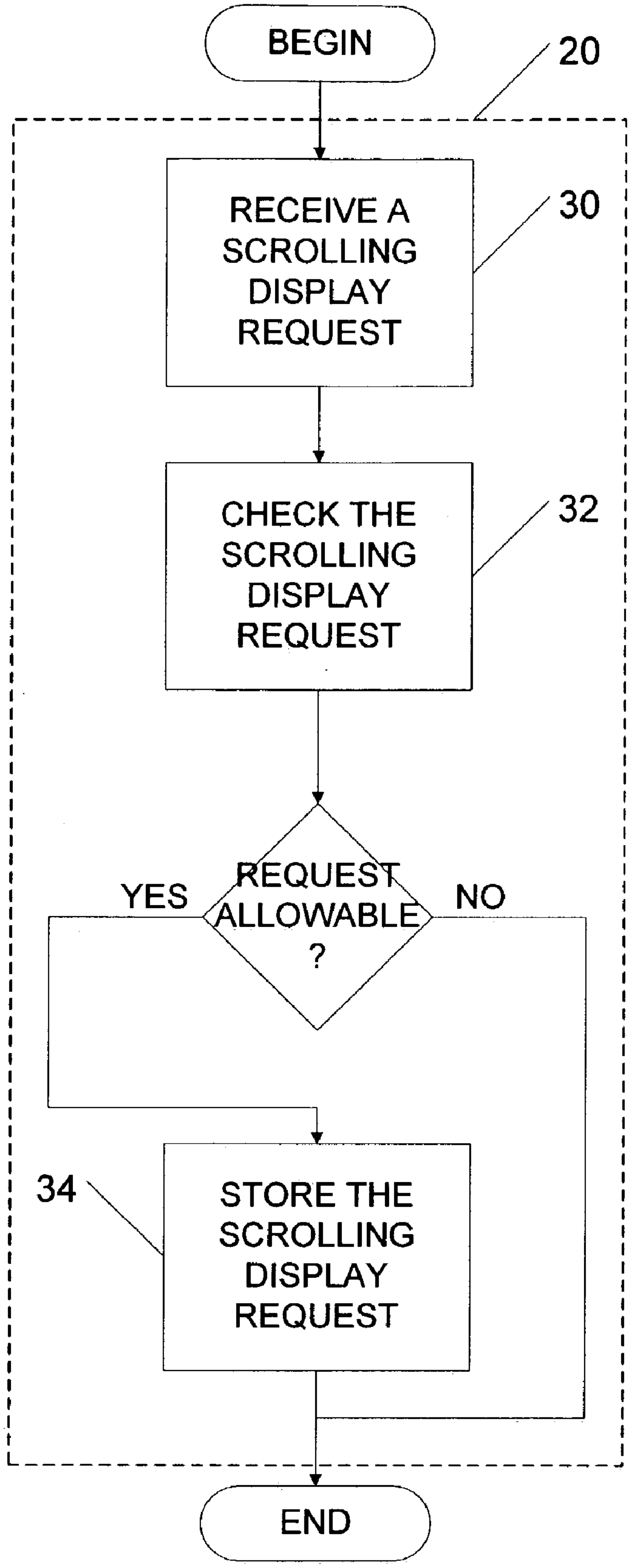
FIG. 4 is a flowchart which shows how the request is provided to the scrolling display apparatus.

Now referring to FIG. 4, there is shown how the request to the scrolling display is provided to the scrolling display controlling apparatus 17.

According to step 30, the request is received by the scrolling display request unit 10.

In the preferred embodiment of the invention, the request is provided using a BSR (Burst Synchronous Responders, wherein 100 kHz bursts on positive cycles of a 60 Hz carrier are interpreted as logic-1s while 100 kHz burst on negative cycles of the 60 Hz carrier are interpreted as logic-0s) by a remote transmitter.

According to step 32, a check is performed with the request.

The check is performed against the database 18. More precisely, the check is performed in order to find out if the request is allowable or not.

In the preferred embodiment, the check is performed by the processing unit 14, using the request and the database 18. It will be appreciated that the database 18 comprises a list of allowable codes.

In the case where the request is allowable and according to step 34, the request is stored, by the processing unit 14, in the database 18.

Figure 5:
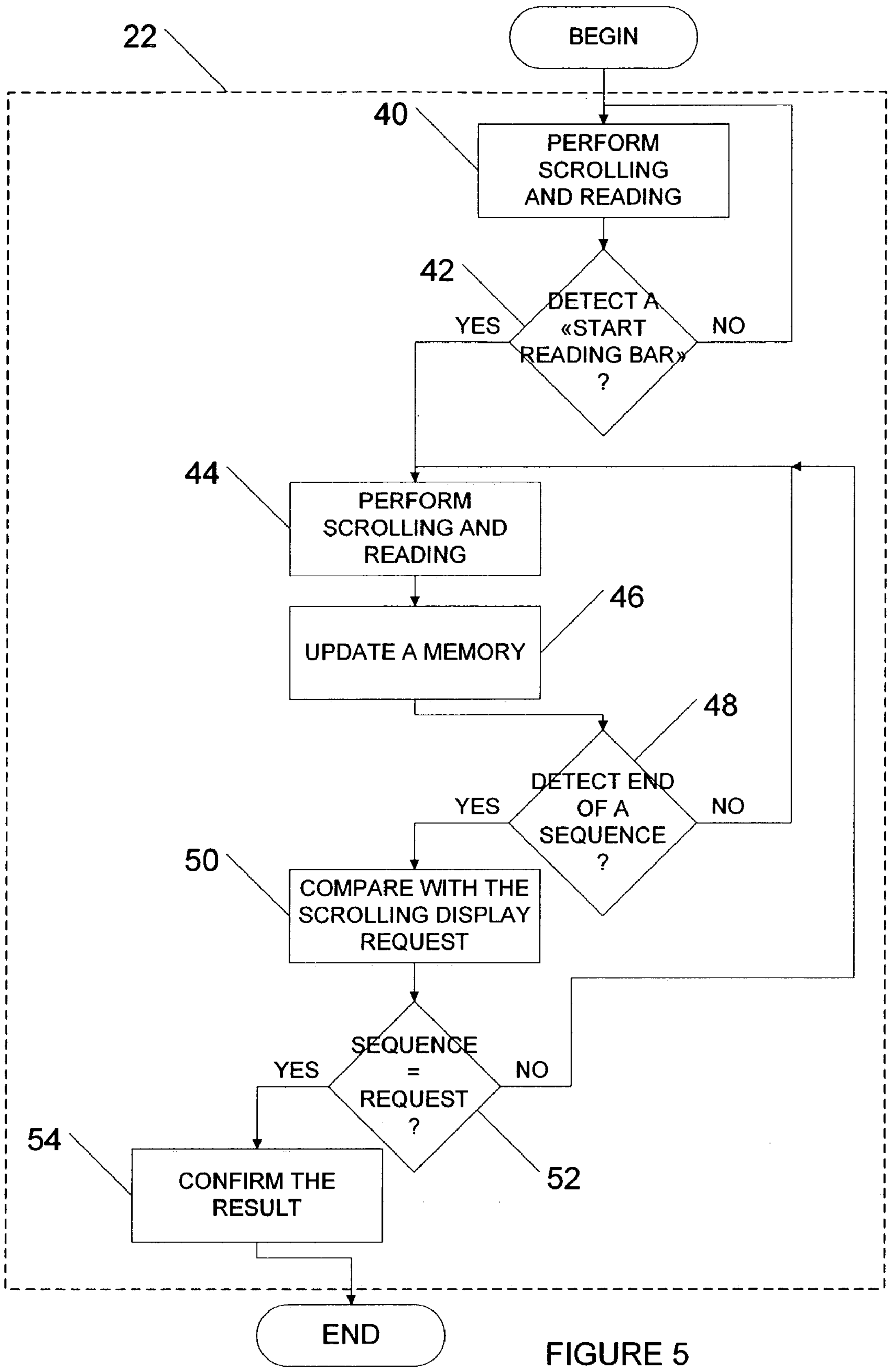
FIG. 5 is a flowchart which shows how the scrolling display apparatus is configured.

Now referring to FIG. 5, there is shown how the scrolling display apparatus is configured using the scrolling display controlling apparatus 17.

According to step 40 a scrolling and a reading are performed. More precisely, the processing unit 14 provides a scrolling display moving control signal to the scrolling display moving unit 16 which moves the scroll. The photo detection unit 12 performs a reading of a corresponding sequence of bar codes located on the moving scroll in order to detect a predetermined sequence of bar codes placed along an edge of the scroll.

According to step 42, a check is performed in order to find out if a “start reading” code is located along the edge of the scroll.

In the case where no “start reading” code is detected along the edge of the scroll, a scrolling and a reading are performed according to step 40.

In the case where a “start reading” code is detected, a scrolling and a reading are performed according to step 44, the scrolling and the reading are performed in order to locate a data code. In fact, the skilled addressee will appreciate that, as explained above, a sequence of bar codes begins with the “start reading” code.

According to step 46, the database 18 is updated by the processing unit 14 with a bar code read according to step 44.

According to step 48, a check is performed in order to find out if the end of the sequence of bar codes is reached.

In fact a sequence has a limited number of bar codes. Moreover and in the preferred embodiment of the invention, a “time-out” having a duration T is implemented. More precisely and in the case where no dark bar code is located during the duration T, a “time-out” signal is provided by the photo-detection unit 12 to the processing unit 14. The "time-out" signal indicates that the end of the current sequence is reached.

In the preferred embodiment of the invention, the duration T is equal to 100 ms.

In the case where the end of the sequence of bar codes is not detected and according to step 44, the scrolling and the reading are performed according to step 44.

In the case where the end of the sequence of bar codes is detected and according to step 50, a comparison is performed, by the processing unit 14, between the data code of the sequence of bar codes read and the request stored in the database 18.

In the case where the data code of the sequence of bar codes read and the request stored in the database identify a same display, and according to step 54, a confirmation routine is performed in the preferred embodiment of the invention.

More precisely, a scrolling and a reading are performed with at least one adjacent sequence of bar codes in order to confirm that the sequence of bar codes read and the request stored in the database 18 identify really the same display.

It will be appreciated that depending on the value of the code read and the request stored in the database 18, the scrolling direction comprised in the scrolling display moving control signal may change.

Figure 6:
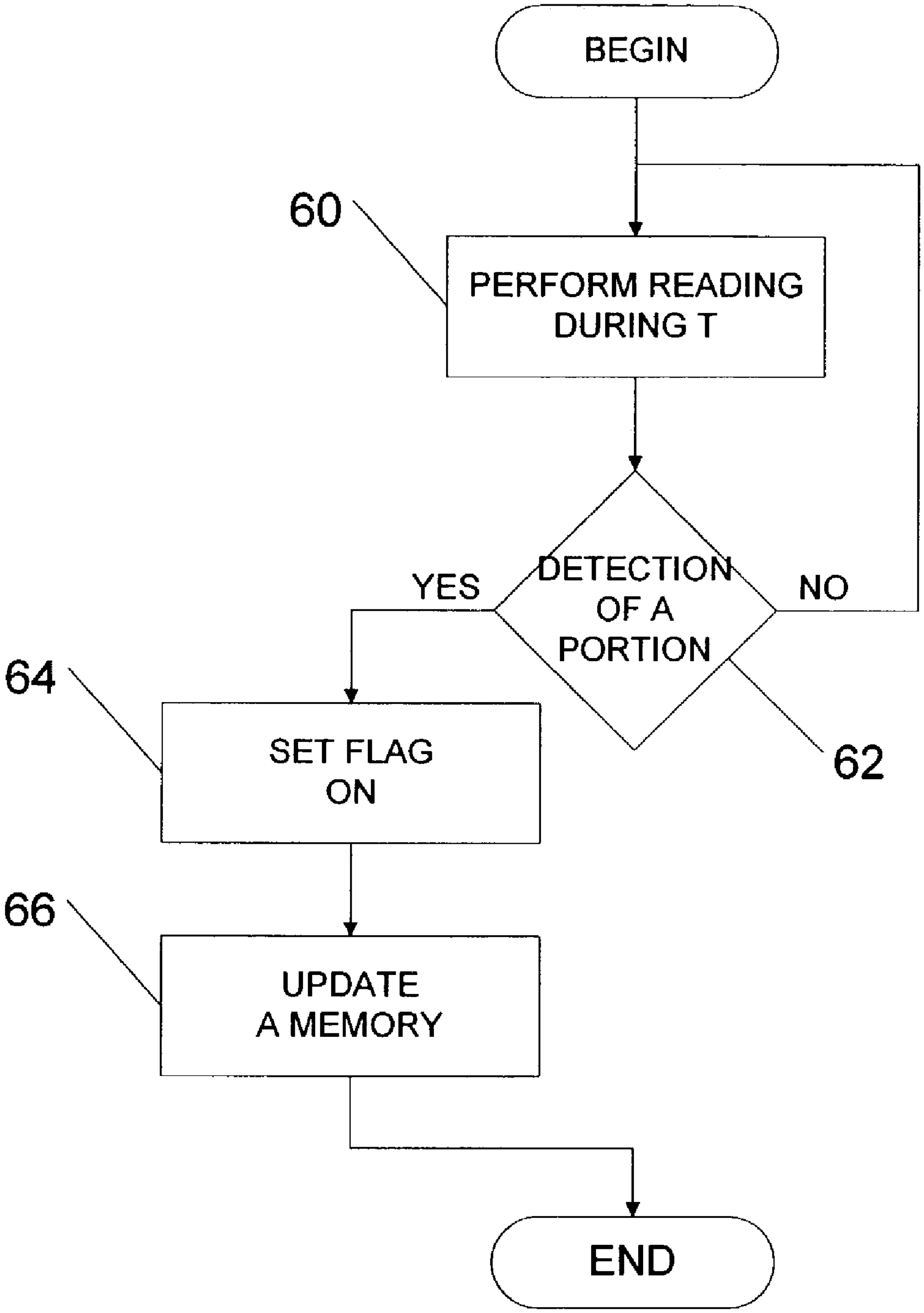
FIG. 6 is a flowchart which shows how a reading is performed according to the preferred embodiment of the invention.

Now referring to FIG. 6, there is shown a flowchart which shows how a reading of a bar of a bar code is performed according to the preferred embodiment of the invention.

According to step 60, the reading of a bar is performed by the photo-detection unit 12 during a duration of T ms. In fact, 200 readings are performed during the duration of T ms.

According to step 62, a check is performed in order to find out if the detection of a bar is performed during the reading. It will be appreciated that in the preferred embodiment of the invention, a bar is detected in the case where at least half of the readings performed according to step 60 provide a detected signal indicative of a dark bar.

In the case where a bar is detected and according to step 64, a flag is set on. It will be appreciated that the flag is used in order to update the memory while still reading the same bar. It will further be appreciated that the flag is set off in the case where a light bar is further read.

According to step 66, the memory is updated.

In an alternative embodiment of the invention, a counter may alternatively be used in order to count a number of bar.

While the preferred embodiment of the invention discloses a scrolling display controlling apparatus adapted to control a single scrolling display, someone skilled in the art will appreciate that a scrolling display controlling apparatus may be used in order to control a plurality of scrolling displays.

In the case for instance of a display adapted to provide the price of gas, four single scrolling displays may be used, each of the scrolling displays being used to display a digit.

Figure 7:
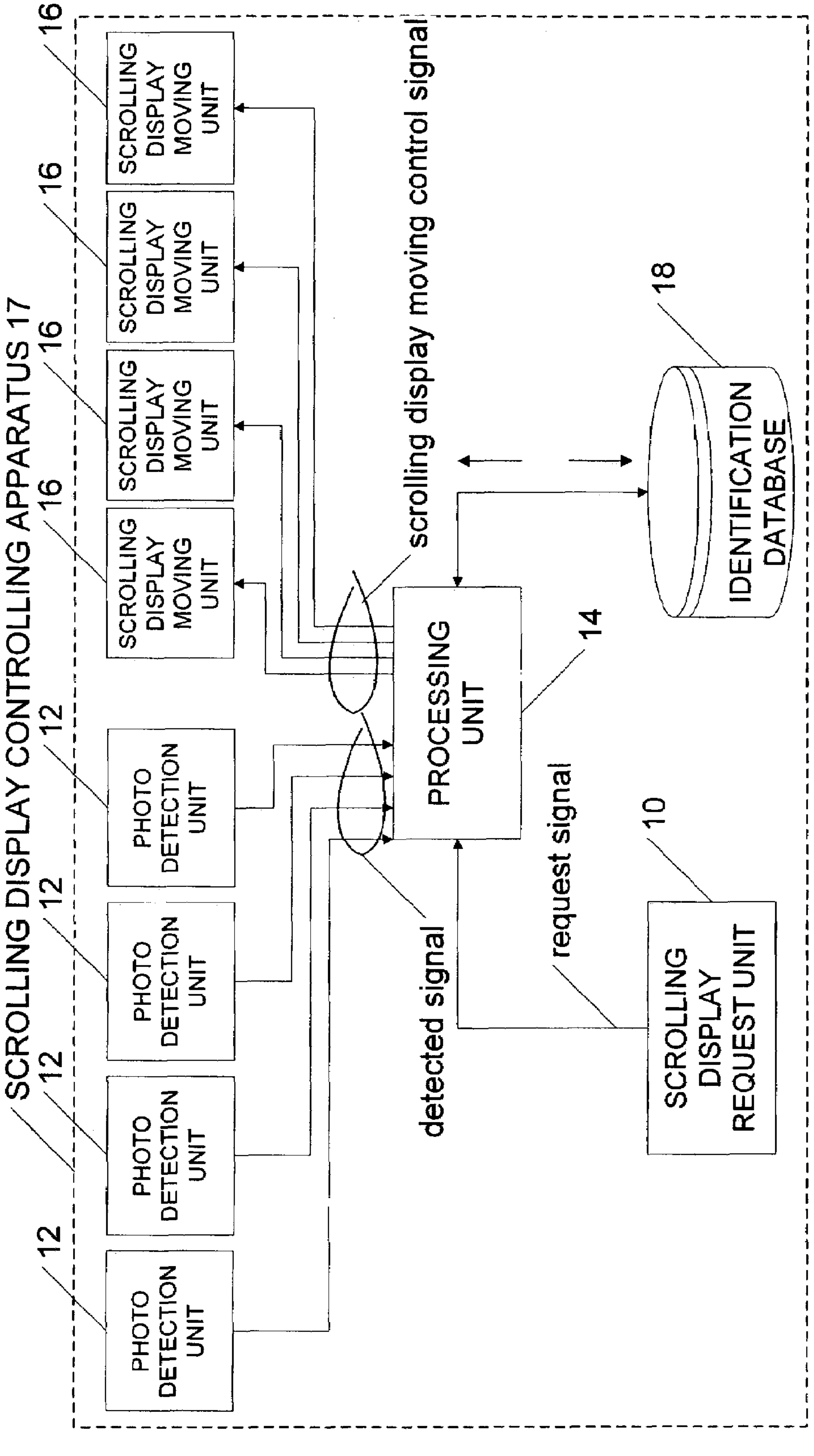
FIG. 7 is a block diagram which shows an example of a scrolling display controlling apparatus for controlling a plurality of scrolling displays.

Now referring to FIG. 7, there is shown an example of the scrolling display controlling apparatus 17 adapted to control the plurality of scrolling displays.

The scrolling display controlling apparatus 17 comprises a plurality of photo detection units 12, a plurality of scrolling display moving units 16, a processing unit 14, a scrolling display request unit 10 and a database 18.

It will be appreciated that each of the plurality of photo detection units 12 is used with a corresponding scrolling display while each of the scrolling display moving unit 16 is used with a corresponding scrolling display.

Preferably, each scrolling display is controlled independently of another one.

In an alternative embodiment, a single scrolling display, having a moving scroll comprising more than one character to display, may be used.

The skilled addressee will however appreciate that it is highly advantageous to have the scrolling display controlling apparatus 17 controlling n independent scrolling displays, wherein each independent scrolling display is used to display a single character, rather than having the scrolling display controlling apparatus 17 controlling a single scrolling display, wherein the single scrolling display is used to display n characters.

In the case for instance of gas, 3 digits are generally used in the United States in order to display the price of the gas. However usually 6 independent scrolling displays are used in order to provide a double-sided display.

The embodiments of the invention described above are intended to be exemplary only. The scope of the invention is therefore intended to be limited solely by the scope of the appended claims.

I claim:

1. A method for controlling a scrolling display, said method comprising:

providing a moving scroll having a plurality of sequences of bar codes, each sequence of bar codes identifying a corresponding display on said moving scroll, each sequence of bar codes comprising a "start reading" code and an associated data code, said associated data code identifying uniquely said corresponding display;

providing a display request comprising a request for a specific display on said moving scroll of said scrolling display;

moving said moving scroll to detect a "start reading" code;

reading the data code associated to said detected "start reading" code;

providing said specific display if said associated data code is representative of said scrolling display request; and wherein each of said plurality of sequences of bar codes comprises a reference positioning code, said reference positioning code being located at a predetermined location in said sequences of bar codes;

further wherein said data code comprises bars having at least one of a first width and a second width, said first width being larger than said second width;

further wherein said reference positioning code and said "start reading code" are bars of the first width.

2. The method as claimed in claim 1, wherein said reference positioning code is the fourth bar in said sequence of bar codes, further comprising adjusting said specific display prior providing said specific display using said reference positioning code.

3. The method as claimed in claim 1, wherein each bar of said data code is of the second width.

4. An apparatus for controlling a scroll of a scrolling display, said apparatus comprising:

a scrolling display request unit providing a request signal;

a scrolling display moving unit for moving said scroll according to a scrolling display moving control signal;

a photo detection unit positioned to detect a sequence of bar codes placed along an edge of said scroll, said sequence of bar codes comprising:

a "start reading" code identifying a beginning of said sequence of bar codes;

a data code associated with said "start reading" code and comprising a plurality of bar codes identifying uniquely said corresponding display, each of said plurality of bar codes and its associated said "start reading" code being spaced by a predetermined space; and a reference positioning code, said reference positioning code being located at a predetermined location in said sequence of bar codes, said reference positioning code being spaced from a neighboring code by said predetermined space; wherein said data code comprises bars having at least one of a first width and a second width, said first width being larger than said second width; further wherein said reference positioning code and said "start reading code" are bars of the first width; said photo detection unit providing a detected signal indicative of a corresponding sequence of bar codes read; and a processing unit receiving said detected signal and said request signal and providing said scrolling display moving control signal.

5. The scrolling display controlling apparatus as claimed in claim 4, further comprising an identification database connected to said processing unit for storing a plurality of allowable request signals.

6. The scrolling display controlling apparatus as claimed in claim 5, wherein said identification database further comprises at least one of a current detected signal and a current request signal.

* * * * *